(12) United States Patent
Abbott

(10) Patent No.: US 12,054,042 B2
(45) Date of Patent: Aug. 6, 2024

(54) SYSTEMS AND METHODS FOR POWER TAKEOFF ATTACHMENT

(71) Applicant: MUNCIE POWER PRODUCTS, INC., Muncie, IN (US)

(72) Inventor: James R. Abbott, Muncie, IN (US)

(73) Assignee: Muncie Power Products, Inc., Muncie, IN (US)

(*) Notice: Subject to any disclaimer, the term of this patent is extended or adjusted under 35 U.S.C. 154(b) by 0 days.

(21) Appl. No.: 17/828,756

(22) Filed: May 31, 2022

(65) Prior Publication Data

US 2022/0388392 A1 Dec. 8, 2022

Related U.S. Application Data

(60) Provisional application No. 63/195,963, filed on Jun. 2, 2021.

(51) Int. Cl.
*B60K 17/28* (2006.01)
*F16H 1/22* (2006.01)

(52) U.S. Cl.
CPC ............ *B60K 17/28* (2013.01); *F16H 1/22* (2013.01)

(58) Field of Classification Search
CPC ........ B60K 17/28; B60K 25/02; B60K 25/06; B60Y 2410/10; B60Y 2304/07; F16H 1/20; F16H 1/22; F16H 57/02; F16H 57/029; F16H 57/031; F16H 2057/0203
See application file for complete search history.

(56) References Cited

U.S. PATENT DOCUMENTS

| | | | | |
|---|---|---|---|---|
| 4,610,175 A | * | 9/1986 | Weis | B60K 17/28 74/606 R |
| 5,645,363 A | * | 7/1997 | Dafforn | B60K 17/28 403/3 |
| 5,913,547 A | * | 6/1999 | Fernandez | F16H 57/02 411/389 |
| 6,224,289 B1 | * | 5/2001 | Redd | B60K 25/06 403/337 |
| 6,564,891 B2 | * | 5/2003 | Ishii | A01B 71/06 74/11 |
| 7,070,036 B2 | * | 7/2006 | Fernandez | B60K 17/28 192/109 R |
| 7,753,148 B2 | * | 7/2010 | Kokot | B60K 25/06 417/364 |
| 8,739,905 B1 | * | 6/2014 | Bennett | F16H 57/028 475/23 |
| 8,984,974 B2 | * | 3/2015 | Seitz | A62C 25/005 74/15.86 |

(Continued)

FOREIGN PATENT DOCUMENTS

FR 2648089 A1 * 12/1990
JP 2016188666 A * 11/2016 ........... F16H 57/021

*Primary Examiner* — Laura Freedman
(74) *Attorney, Agent, or Firm* — Daniel L. Boots.; Brian W. Chellgren; Dentons Bingham Greenebaum LLP

(57) ABSTRACT

This invention relates to power takeoff devices (PTOs), which are useful for mounting on transmissions and for performing, directly or indirectly, useful work via the PTO's rotatable output shaft. A system and method designed for quick and convenient installation of a PTO and an attachment element. In some embodiments, the attachment element is an adapter configured to secure a transmission and the PTO is configured to attach to the adapter.

20 Claims, 17 Drawing Sheets

(56) References Cited

U.S. PATENT DOCUMENTS

| | | | | |
|---|---|---|---|---|
| 9,103,430 B2* | 8/2015 | Zalanca | ................ | F16H 57/037 |
| 9,994,102 B2* | 6/2018 | Simon | ................... | B60K 25/06 |
| 10,053,140 B2* | 8/2018 | Park | ................... | B62D 5/0403 |
| 2011/0162466 A1* | 7/2011 | Hillyer | ................... | B60K 17/28 |
| | | | | 74/11 |

* cited by examiner

SYSTEMS AND METHODS FOR POWER TAKEOFF ATTACHMENT

CROSS-REFERENCE TO RELATED APPLICATION

This application claims the benefit of U.S. provisional patent application Ser. No. 63/195,963, filed Jun. 2, 2021, for SYSTEMS AND METHODS FOR POWER TAKEOFF ATTACHMENT, incorporated herein by reference.

FIELD

This invention relates to power takeoff devices (PTOs), which are useful for mounting on transmissions and for performing, directly or indirectly, useful work via the PTO's rotatable output shaft. A system and method designed for quick and convenient installation of a PTO and an attachment element. In some embodiments, the attachment element is an adapter configured to secure to a transmission and the PTO is configured to attach to the adapter.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to the auxiliary device connected to the PTO.

Installation of a PTO onto an engine transmission is often challenging. A PTO will typically be fastened to an engine transmission via fasteners, such as bolts or cap screws, extending through channels in the PTO housing, and threaded into corresponding channels in the transmission. Access to the fasteners is restricted by the positioning of other engine components, the size and shape of the PTO itself, and other space limitations. In addition, an installer often must manually support a relatively heavy PTO during the installation process. It can thus be difficult for the installer to use a torque wrench to achieve a desired tension on the fasteners securing the PTO to the engine transmission while facing space limitations and simultaneously supporting the weight of the PTO. If the proper tension is not achieved, the assembly of the PTO and engine transmission may be vulnerable to leaking or failure.

The inventor of the present disclosure realized that improvements in systems and methods for attachment of PTOs are needed to simplify the installation of PTOs. Certain preferred features of the present disclosure address these and other needs and provide other important advantages.

SUMMARY

Systems and methods for PTO attachment include a PTO and an attached element. In some embodiments, the attached element is an adapter carrying an input gear and a separate PTO carries an output gear and, optionally, an intermediate gear. In contrast, a traditional PTO carries an input gear for rotationally engaging a transmission gear, an output gear attached to a rotatable output shaft and, optionally, an intermediate gear between and rotationally engaging both the input gear and output gear in a single housing. The adapter is secured to a transmission such that the input gear rotationally engages the transmission gear. The PTO is then removably attached to the adapter such that the output gear rotationally engages the input gear. The installer may secure the adapter to the engine transmission via fasteners with additional clearance for using a torque wrench as the PTO is not yet present. The PTO is subsequently attached to the adapter using a disclosed attachment means that does not require the use of a torque wrench or substantial clearance. In addition, this two-step attachment method allows the installer to support only the relatively light adapter while securing it to the engine transmission. The remaining PTO portion of the system can then be quickly and easily attached to the adapter using the disclosed attachment means so that the installer is never required to manually support the entire system during installation.

In other embodiments, the attached element is a pump, gear box, compressor, or other equipment as is commonly attached to a PTO, and is attached using the attachment means disclosed herein.

In some embodiments, the present invention is a system for attaching a power takeoff (PTO) to an attachment element, comprising an attachment element including an attachment element housing including a first attachment surface; a PTO including a PTO housing including a second attachment surface configured to engage the first attachment surface; an engagement mechanism for removably attaching the PTO housing to the attachment element housing, the engagement mechanism including at least one bore in one of the attachment element housing and the PTO housing, each bore including a moveable element operably sized to travel between a first position wherein the moveable element is located within the bore and a second position wherein the moveable element is located at least partially external to the bore, and a biasing mechanism operably engaged to the moveable element and to the one of the attachment element housing and the PTO housing such that the moveable element is biased toward the second position; and at least one female interlock removably attached to the other of the attachment element housing and the PTO housing, the female interlock configured to engage the moveable element when the first attachment surface abuts the second attachment surface and when the moveable element is in the second position.

In further embodiments, the attachment element housing includes a mounting surface opposite and spaced apart from the first attachment surface and at least one side extending between the mounting surface and the first attachment surface, the at least one side including an interior and an exterior, and an internal void defined by the interior of the at least one side; and the system further includes a means for securing the mounting surface to a transmission housing. In some embodiments, the second attachment surface is bordered by a descending skirt sized and configured to receive at least a portion of the at least one side of the attachment element. In certain embodiments, the system further includes an input shaft carried on the attachment element housing, the input shaft extending from the at least one side across the internal void; and an input gear carried on and rotatable about the input shaft, the input gear located partially within the internal void and extending radially from the internal void in the direction of the mounting surface and in the direction of the first attachment surface; and wherein, when the mounting surface engages the transmission housing, the input gear engages a transmission gear carried on the transmission housing. In further embodiments, the PTO housing includes a cavity internal to the PTO housing; and the system further includes an output shaft carried on the PTO housing, the output shaft extending across the cavity; and an output gear carried on and rotatable about the output shaft, the output gear located at least partially within the cavity. In some embodiments, the first attachment surface engages the second attachment surface, the input gear extends into the cavity and engages the output gear, such that rotational force of the transmission gear is transferred through the input gear to the output gear. In certain embodiments, the system further includes a raised rim on the first attachment surface, the raised rim bordering the interior of the at least one side and extending substantially perpendicular from the first attachment surface, and wherein the raised rim is sized and shaped to extend within the cavity when the PTO housing is attached to the attachment element housing. In further embodiments, the moveable element is one of a substantially spherical ball and a roller. In some embodiments, the female interlock includes a female locking feature and a ramp inclined at a non-parallel and non-perpendicular angle in respect to the female locking feature and the bore. In certain embodiments, at the first position, the moveable element is located entirely within the bore. In further embodiments, the female interlock is removably attached to the other of the attachment element housing and the PTO housing via a removable pin extending through the female interlock and into the other of the attachment element housing and the PTO housing.

In some embodiments, the present invention is a system for attaching a power takeoff (PTO) to a transmission, comprising: an attachment element including an attachment element housing including a mounting surface, a first attachment surface opposite and spaced apart from the mounting surface, at least one side extending between the mounting surface and the first attachment surface, the at least one side including an interior and an exterior, and an internal void defined by the interior of the at least one side; an input shaft carried on the attachment element housing, the input shaft extending from the at least one side across the internal void; an input gear carried on and rotatable about the input shaft, the input gear located partially within the internal void and extending radially from the internal void in the direction of the mounting surface and in the direction of the first attachment surface; a PTO including a PTO housing including a second attachment surface configured to engage the first attachment surface, and a cavity internal to the PTO housing; an output shaft carried on the PTO housing, the output shaft extending across the cavity; an output gear carried on and rotatable about the output shaft, the output gear located at least partially within the cavity; means for securing the mounting surface of the attachment element housing to a transmission housing; and an engagement mechanism for removably attaching the PTO housing to the attachment element housing; wherein, when the first attachment surface engages the second attachment surface, the input gear extends into the cavity and engages the output gear; and wherein, when the mounting surface engages the transmission housing, the input gear engages a transmission gear carried on the transmission housing, such that rotational force of the transmission gear is transferred through the input gear to the output gear.

In some embodiments, the engagement mechanism includes one of a ball detent and a roller detent. In further embodiments, the engagement mechanism includes at least one bore in one of the attachment element housing and the PTO housing, each bore including a moveable element operably sized to travel between a first position wherein the moveable element is located substantially entirely within the bore and a second position wherein the moveable element is located at least partially external to the bore, and a biasing mechanism operably engaged to the moveable element and to the one of the attachment element housing and the PTO housing such that the ball is biased toward the second position; and at least one female interlock removably attached to the other of the attachment element housing and the PTO housing, the female interlock configured to engage the moveable element when the first attachment surface abuts the second attachment surface and when the moveable element is in the second position. In certain embodiments, the female interlock is removably attached to the other of the attachment element housing and the PTO housing via a removable pin extending through the female interlock and into the other of the attachment element housing and the PTO housing.

In some embodiments, the present invention is a method of installing a power takeoff, comprising: providing a system for attaching a power takeoff (PTO) to a transmission as described above; securing the attachment element housing to a transmission; and attaching the PTO housing to the attachment element housing via the engagement mechanism.

In some embodiments, the present invention is a method of uninstalling a power takeoff, comprising: providing a system for attaching a power takeoff (PTO) to a transmission as described above; removing the removable pin; removing the female interlock; and separating the PTO from the attachment element.

In some embodiments, the present invention is a method of mounting a power takeoff (PTO), comprising: providing a transmission housing including at least one transmission housing channel; providing a system for attaching a power takeoff (PTO) to an attachment element as described above, wherein the attachment element housing includes at least one channel extending from the first attachment surface to the mounting surface, the at least one channel aligned with the at least one transmission housing channel; contacting the mounting surface against the transmission housing; inserting a fastener through the at least one channel into the at least one transmission housing channel; contacting the first attachment surface to the second attachment surface; and attaching the PTO housing to the attachment element housing via the engagement mechanism. In further embodiments, the fastener, when inserted through the at least one channel into the at least one transmission housing channel, does not extend out of the at least one channel in the direction of the first attachment surface. In certain embodiments, attaching the PTO housing to the attachment element housing via the engagement mechanism includes engaging the movable element using the female interlock when the movable element is in the second position.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1:
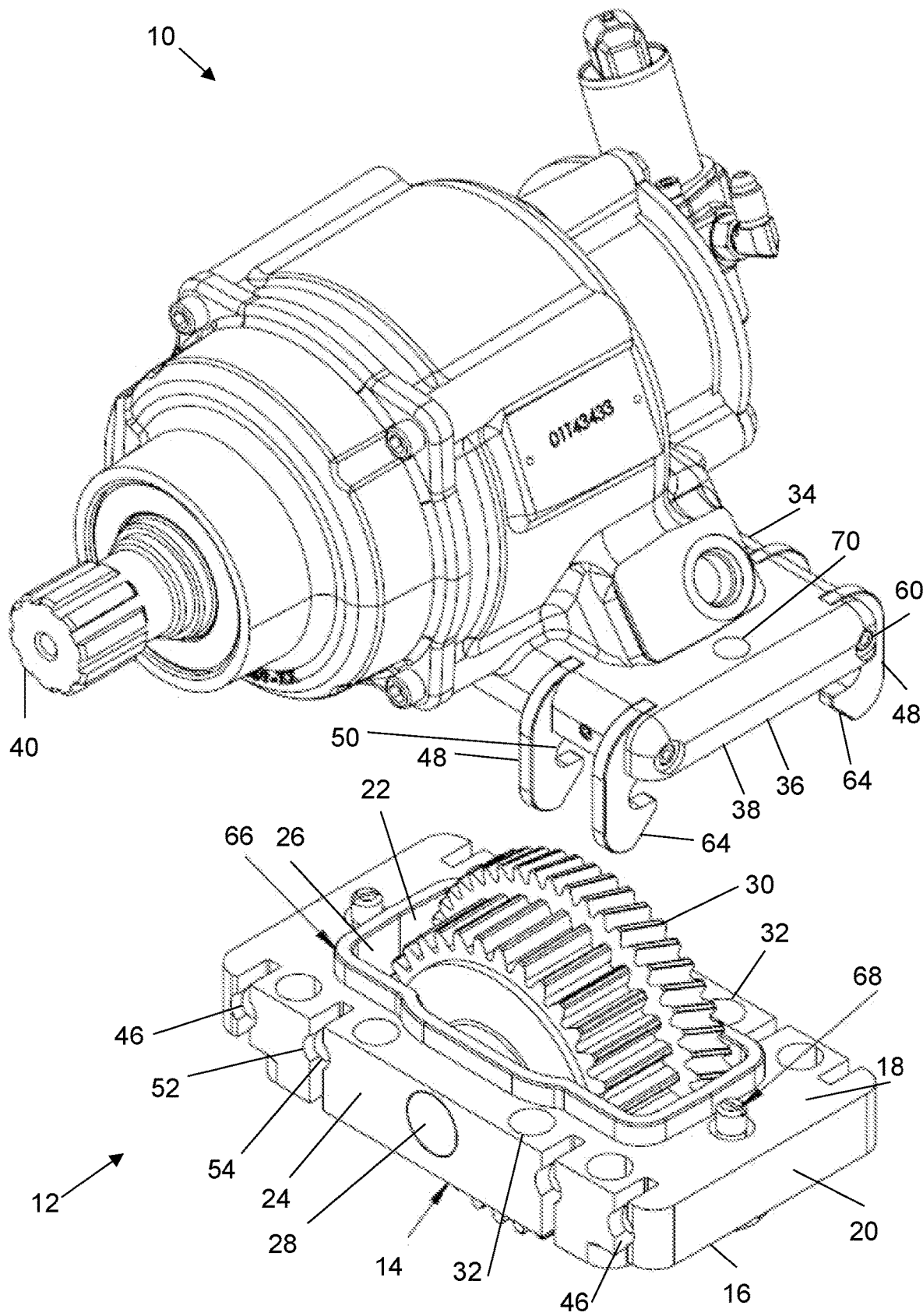
FIG. 1 depicts perspective view of a spaced apart PTO and adapter according to a first embodiment of the present invention.
Figure 2:
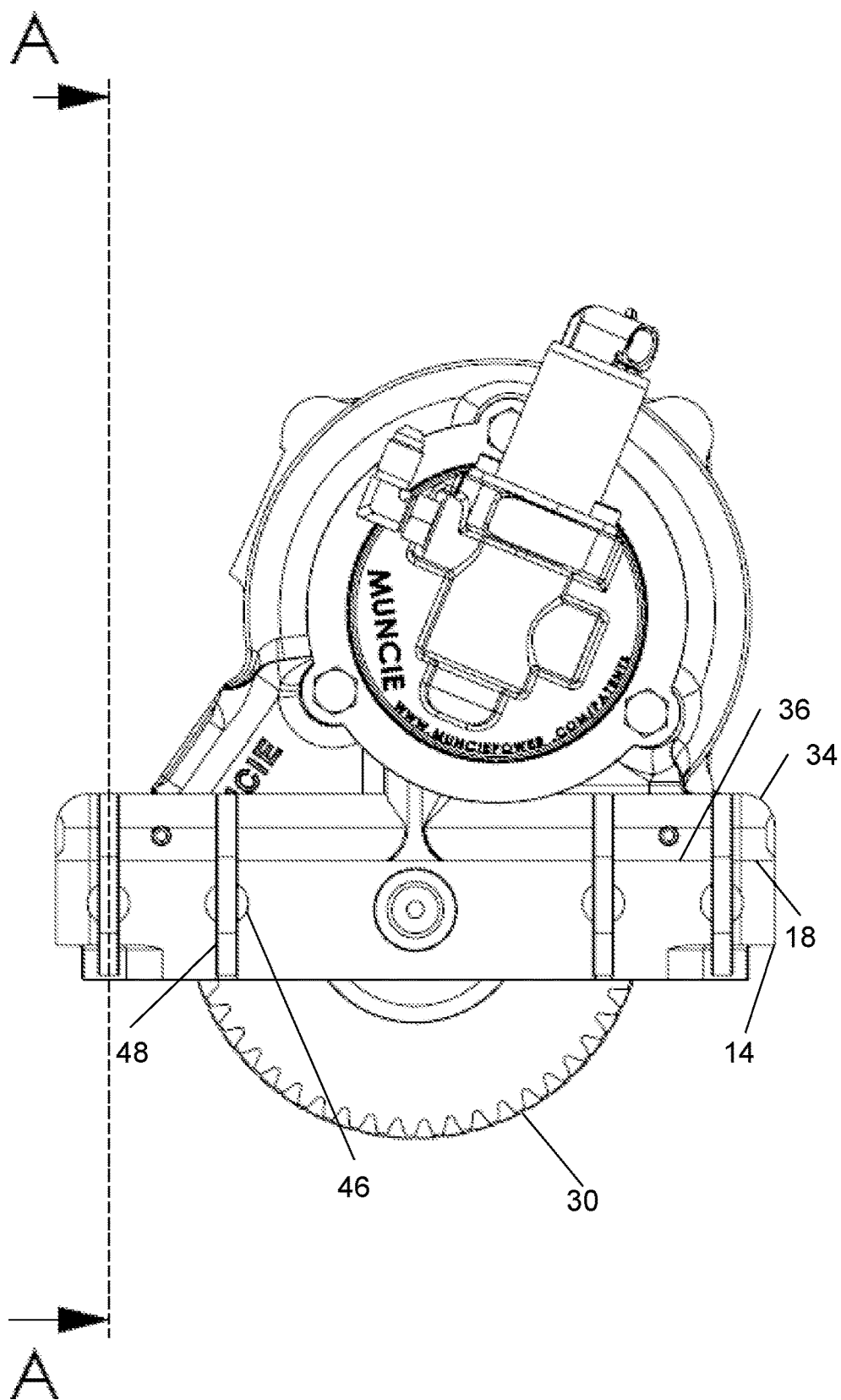
FIG. 2 depicts a side view of an assembled PTO and adapter.
Figure 3:
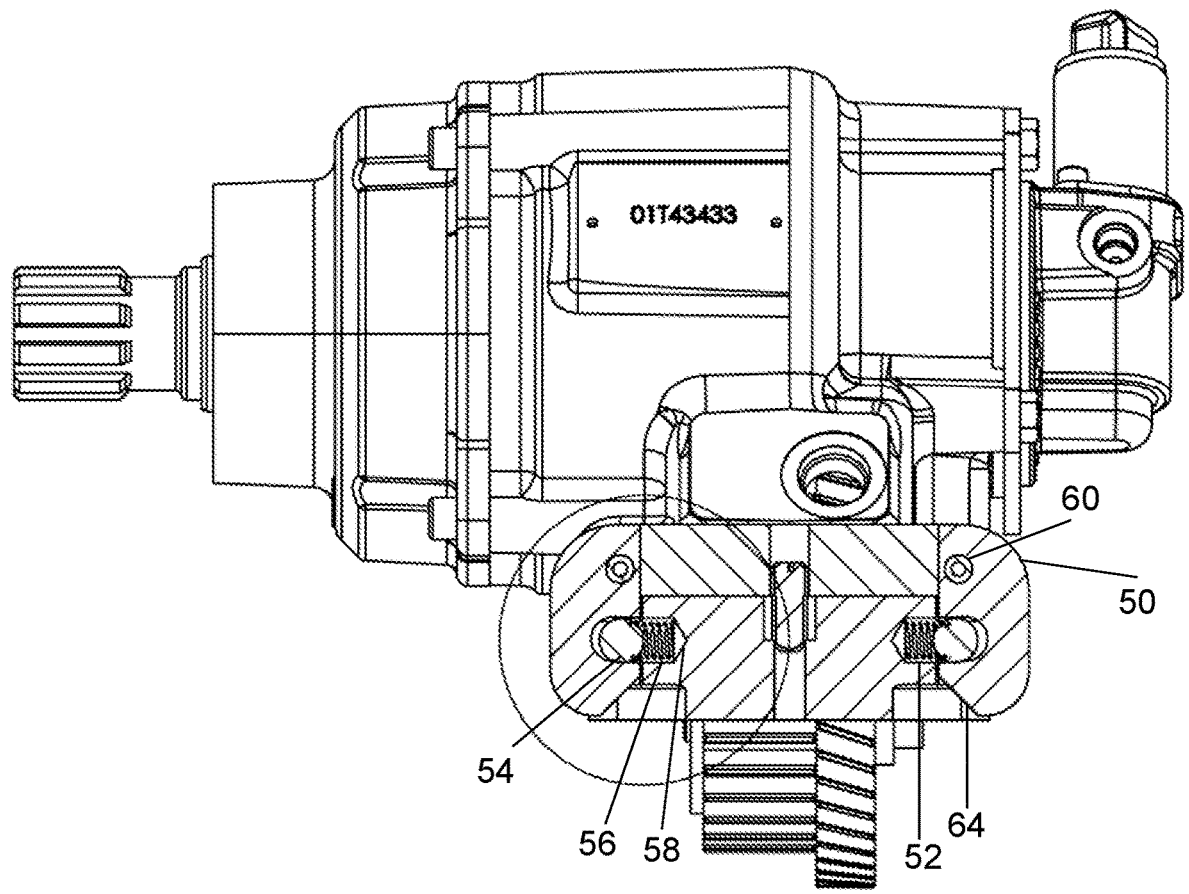
FIG. 3 depicts a cross-sectional front view of the assembled PTO and adapter along lines A-A of FIG. 2.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. The words "about" or "approximately," when used with numbers and unless otherwise defined, refer to values within 10% of the most precise digit of the numbers (e.g., "about 1" refers to the range of 0.9 to 1.1, while "about 1.0" refers to the range of 0.99 to 1.01). Discussions pertaining to specific compositions of matter, if present, are presented as examples only and do not limit the applicability of other compositions of matter, especially other compositions of matter with similar properties, unless otherwise indicated.

Embodiments of the present invention include a system and method for attaching a PTO 10 to an attachment element 12 including an attachment element housing 14. Referring to FIGS. 1-7, and according to a first embodiment of the present invention, the attachment element 12 functions as an adapter between the PTO 10 and a transmission (not shown). In the depicted first embodiment, the attachment element housing 14 is substantially rectangular in shape including a mounting surface 16, a first attachment surface 18 opposite and spaced apart from the mounting surface 16, at least one side 20 extending between the mounting surface 16 and the first attachment surface 18, the at least one side 20 including an interior 22 and an exterior 24, and an internal void 26 defined by the interior 22 of the at least one side 20.

The attachment element housing 14 carries an input shaft 28 extending from the at least one side 20 across the internal void 26. An input gear 30 is carried on and rotatable about the input shaft 28. The input gear 30 is located partially within the internal void 26. The radial diameter of the input gear 30 is greater than the distance between the first attachment surface 18 and the mounting surface 16, such that the input gear 20 extends radially from the internal void 26 in the direction of both the mounting surface 16 and in the direction of the first attachment surface 18.

In some embodiments, the attachment element housing 14 includes at least one channel 32 extending from the first attachment surface 18 to the mounting surface 16, the channel 32 being sized to receive a fastener (not shown) such as, for example, a bolt or cap screw. The at least one channel 32 is located in the attachment element housing 14 to align with corresponding channel(s) in a transmission, such that the fastener may extend through the at least one channel 32 and thread into the corresponding transmission channel to secure the mounting surface 16 against the transmission. In preferred embodiments, the fastener, when threaded into the transmission channel, will not extend from the at least one channel 32 in the direction of the first attachment surface 18. When the attachment element 12 is secured to the transmission, the input gear 30 extends radially in the direction of the mounting surface 16 to engage a transmission gear (not shown) carried on and at least partially within the transmission, such that rotational force of the transmission gear may be transferred to the input gear 30.

The system further includes a PTO 10 including a PTO housing 34. In the depicted first embodiment, the PTO housing 34 includes a second attachment surface 36 configured to engage the first attachment surface 18 and includes an internal cavity 38 accessible through the second attachment surface 36. The PTO housing 34 carries an output shaft 40 extending across the internal cavity 38. An output gear (not shown) is carried on and rotatable about the output shaft 40. The output gear is located at least partially within the internal cavity 38. When the PTO 10 is attached to the attachment element 12, the first attachment surface 18 is substantially flush against the second attachment surface 36. The input gear 30 extends radially in the direction of the first and second attachment surfaces 18, 36 to engage the output gear carried on and at least partially within the internal cavity 38, such that rotational force of the transmission gear may be transferred to the output gear via the input gear 30. In some embodiments (not shown), the PTO housing may optionally include an intermediate gear at least partially within the housing, such that, when the attachment element 12 and PTO are attached, the input gear 30 engages the intermediate gear which in turn engages the output gear.

The PTO 10 attaches to the attachment element 12 via an engagement mechanism 44. In some embodiments, the engagement mechanism 44 includes one or more male interlocks 46 located on one of the PTO housing 34 and the attachment element housing 14 and one or more female interlocks 48 located on the other of the PTO housing 34 and the attachment element housing 14. In the depicted embodiment, the engagement mechanism 44 includes a male interlock 46, such as a ball detent, located on the attachment element housing 14 and a female interlock 48, such as a shaped member located on the PTO housing 34 and including a female locking feature 50 configured to receive and engage at least a portion of the male interlock 46. In the depicted embodiment, the male interlock 46 includes at least one bore 52 in the exterior 24 of the side 20 of the attachment element housing 14. Each bore 52 includes a moveable element 54, such as, for example, substantially spherical ball, operably sized to travel between a first position wherein the moveable element 54 is located substantially entirely within the bore 52 and a second position wherein the moveable element 54 is located at least partially external to the bore 52. A biasing mechanism 56, such as, for example, a coil spring, leaf spring, opposing magnets, ramp, armature, or similar mechanisms as known in the art, is configured to bias the moveable element 54 towards the second position. In the depicted embodiment, the biasing mechanism 56 is a coil spring located in the bore 52, the coil spring including a pair of opposing ends operably engaged to the moveable element 54 at one end and to the attachment element housing 14 at the opposite end. In some embodiments, a retaining element 58 is used to prevent the moveable element 54 and/or biasing mechanism 56 from entirely exiting the bore 52. The retaining element 58 may be a roll pin, set screw, stake, or similar element as known in the art.

In the depicted embodiment, the female interlock 48 includes a female locking feature 50, such as a cutout, groove, slot, recess, or similar feature as known in the art, sized and shaped to receive at least a portion of the moveable element 54 when the moveable element 54 is in the second position, the biasing mechanism 56 forcing the moveable element 54 into the female locking feature 50. When the PTO 10 and attachment element 12 are assembled, the first attachment surface 18 contacts the second attachment surface 36 and the engagement mechanism 44 prevents the two attachment surfaces 18, 36 from separating.

In the depicted embodiment, the female interlock 48 is removably attached to the PTO housing 34 via a pin 60 extending through the female interlock 48 and into the PTO housing 34. By removing the pin 60, the female interlock 48 may be removed from the PTO housing 34, disengaging and disassembling the engagement mechanism 44, and allowing the PTO 10 to be separated from the attachment element 12. In other embodiments (not shown) where the PTO 10 is to be permanently attached to the attachment element 12, the female interlock 48 is machined directly onto the PTO housing 34. In some embodiments, the pin 60 may include a threaded cylindrical bore 62, such that a threaded member can be screwed into the threaded cylindrical bore 62 to engage the pin 60, then the threaded member linearly retracted to pull the pin 60 out of the PTO housing 34.

Figure 4:
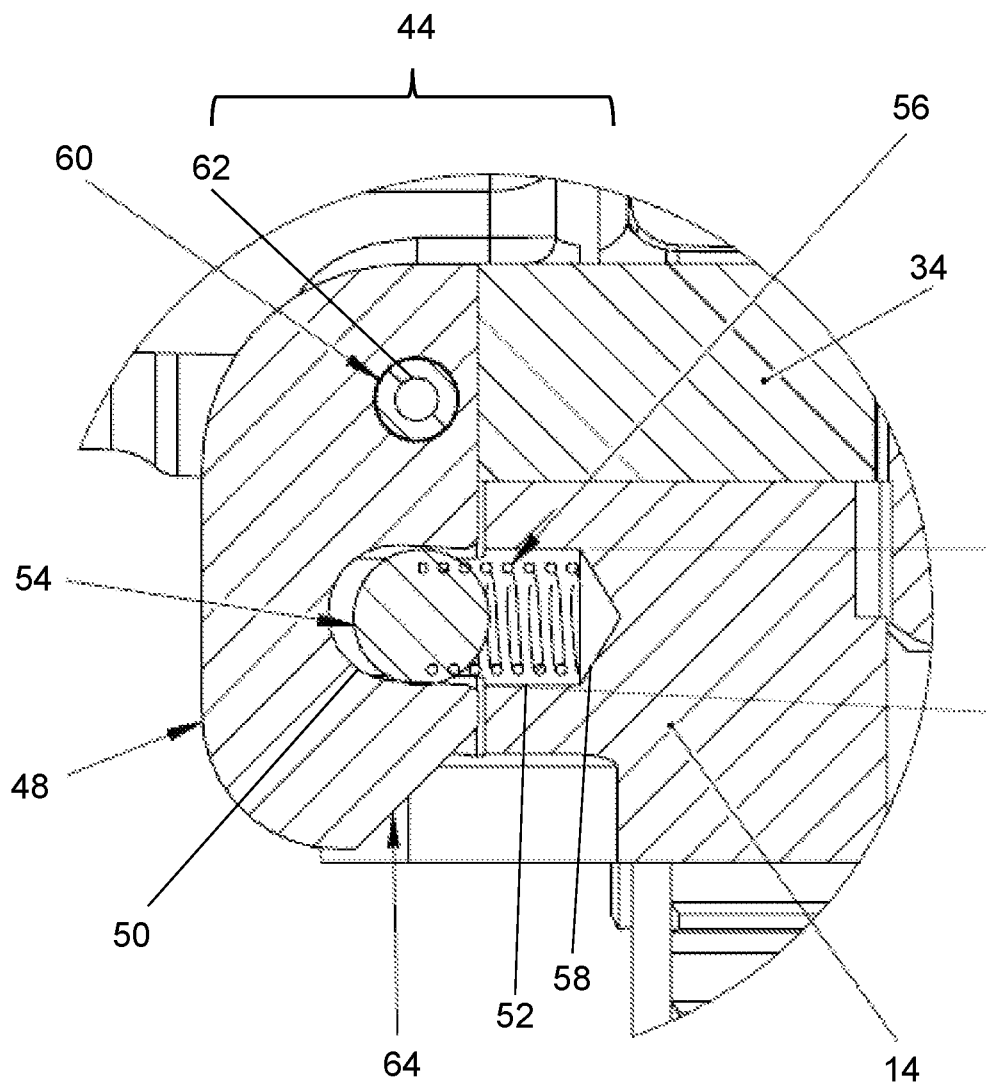
FIG. 4 depicts a magnified view of a section of FIG. 3.
Figure 5:
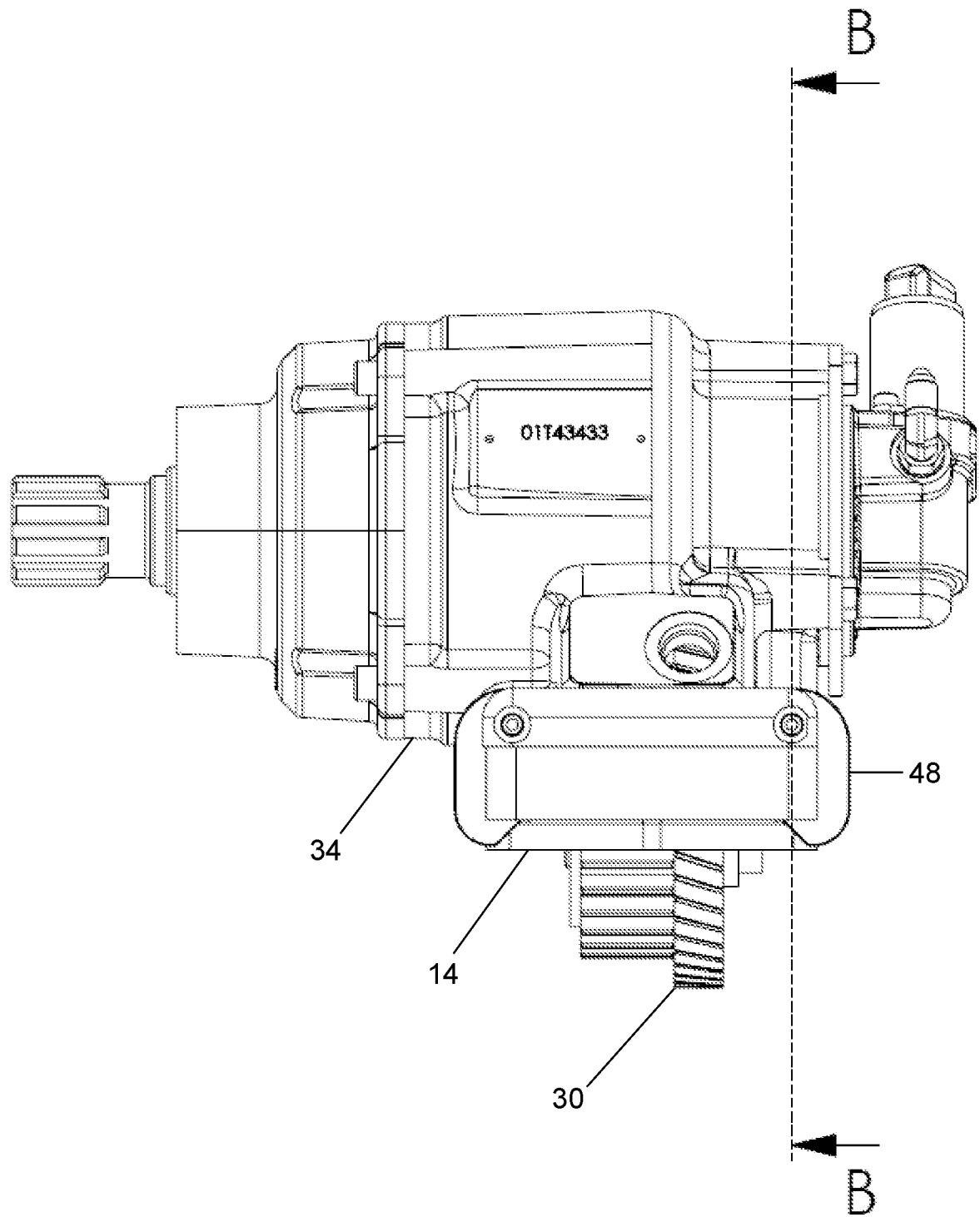
FIG. 5 depicts a front view of the assembled PTO and adapter.
Figure 6:
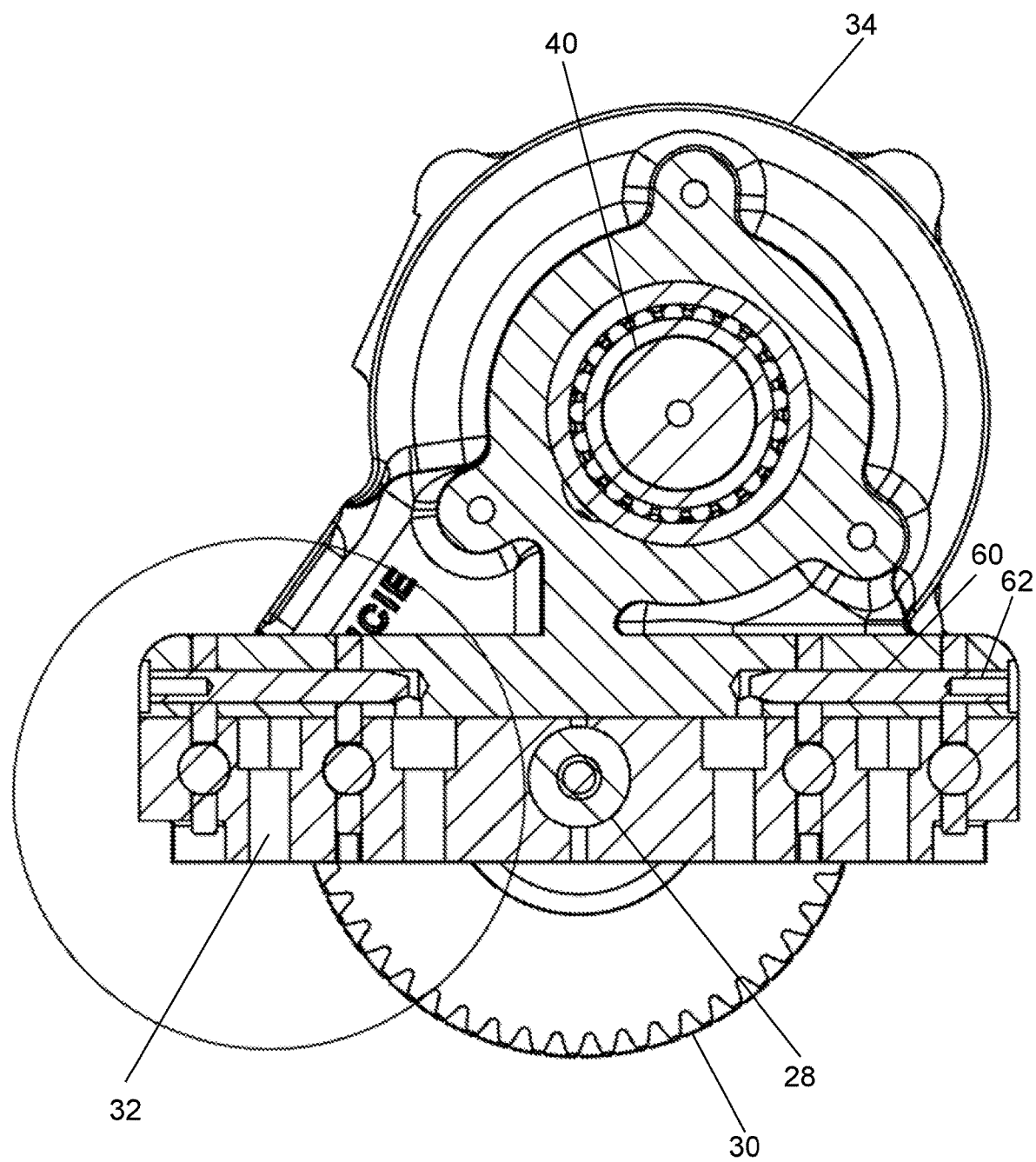
FIG. 6 depicts a cross-sectional side view of the assembled PTO and adapter along lines B-B of FIG. 5.
Figure 7:
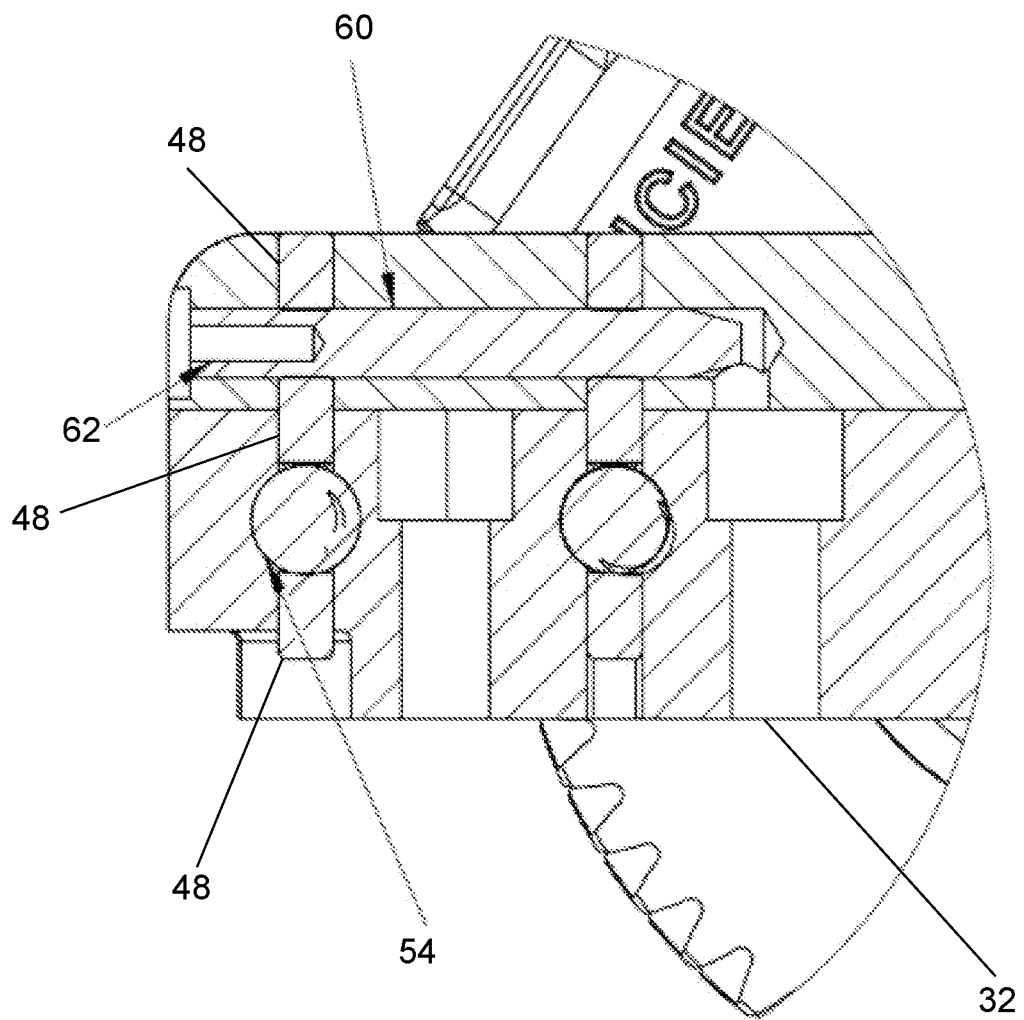
FIG. 7 depicts a magnified view of a section of FIG. 6.

As most easily seen in FIG. 4, the female interlock 48 includes a ramp 64 inclined at a non-parallel and non-perpendicular angle in respect to the female locking feature 50 and the bore 52. In some embodiments, the angle is between 30 degrees and 60 degrees, between 35 degrees and 55 degrees, between 40 degrees and 50 degrees, or about 45 degrees. As the PTO 10 and attachment element 12 move from a spaced apart relationship (as shown in FIG. 1) to the an engaged relationship (as shown in FIGS. 2-7), the ramp 64 contacts the moveable element 54, forcing the moveable element 54 to transition from the second position to the first position by driving the moveable element 54 into the bore 52. Once the ramp 64 bypasses the moveable element 54, the biasing mechanism 56 returns the moveable element 54 to the second position, forcing the moveable element 54 into the female locking feature 50 and thereby mechanically interlocking the PTO 10 and attachment element 12.

In other embodiments (not shown), the male interlocks 46 are located in the PTO housing 34 and the female interlocks 48 are located on the attachment element housing 12. In further embodiments, male interlocks 46 and female interlocks 48 may be present on both the PTO housing 34 and the attachment element housing 12.

In some embodiments, one of the first attachment surface 18 and second attachment surface 36 includes one or more mounting features. In the depicted embodiment, the mounting features include a raised rim 66 on the first attachment surface 18, the raised rim 66 bordering the interior 22 of the at least one side 20 and extending substantially perpendicular from the first attachment surface 18. The raised rim 66 is sized and shaped to extend within the internal cavity 38 of the PTO housing 34 when the PTO housing 34 is attached to the attachment element housing 12. In some embodiments, the edge of the raised rim 66 may include an O-ring (not shown) to form a seal between the attachment element 12 and the PTO 10. In the depicted embodiment, the mounting features further include at least one lug 68 extending substantially perpendicular from the first attachment surface 18. The PTO housing 34 includes at least one lug channel 70 corresponding to each of the at least one lug 68, each lug channel 70 sized and located to receive a lug 68 when the housings 12, 34 are attached. The at least one lug 68 extending into the at least one lug channel 70 and the raised rim 66 extending into the internal cavity 38 both prevent the PTO 10 from moving with respect to the attachment element 12 in the directions defined by the plane of the first and second attachment surfaces 18, 36 when the PTO 10 and attachment element 12 are attached to each other. In other embodiments (not shown), one or more of the mounting features shown on the attachment element housing 12 may be located on the PTO housing 34 and one or more of the mounting features shown on the PTO housing 34 may be located on the attachment element housing 12. In further embodiments (not shown), other or additional mounting features may be used to attach the PTO 10 to the attachment element 12, such as, for example, pins, threaded fasteners, rails, and other means for attachment as known in the art.

In use, the system and method for PTO attachment includes a two-step attachment process. In the first step, the mounting surface 16 of the attachment element 12 is contacted to a transmission at a location where the input gear 30 carried by the attachment element 12 is operatively engaged to a transmission gear carried by the transmission. The attachment element 12 is then secured to the transmission, such as, for example, by inserting fasteners through the at least one channel 32 extending from the first attachment surface 18 to the mounting surface 16, and onward into a corresponding channel in the transmission. An installer may then, in some embodiments, use a torque wrench to apply a desired tension to the fasteners. Additional or alternative means for securing the attachment element 12 to the transmission may also be used. When the attachment element 12 is secured to the transmission, the input gear 30 extends radially in the direction of the mounting surface 16 to engage a transmission gear carried on and at least partially within the transmission, such that rotational force of the transmission gear may be transferred to the input gear 30.

In the second step, the second attachment surface 36 of the PTO 10 is advanced towards and contacted against the first attachment surface 18 of the attachment element 12. As the PTO 10 advances, the ramp 64 of the female interlock 48 contacts and drives the moveable element 54 from the second position to the first position. After the ramp 64 passes the moveable element 54, the moveable element 54 returns to the second position where it is received by the female locking feature 50. This mechanical engagement between the moveable element 54 and female locking feature 50 prevents the PTO 10 from separating from the attachment element 12 in a direction perpendicular to the attachment surfaces 18, 36. As described above, mounting features located on the attachment element 12 are inserted into corresponding receptacles located on the PTO to prevent the PTO 10 from moving with respect to the attachment element 12 in directions in the plane of the attachment surfaces 18, 36.

To separate the PTO 10 from the attachment element 12, an individual would remove the pins 60 extending through the at least one female interlock 48, remove the female interlock 48 from the PTO 10, thereby disassembling the engagement mechanism 44, then move the PTO 10 apart from the attachment element 12 in a direction perpendicular to the attachment surfaces 18, 36.

Referring now to FIGS. 8-17, and according to a second embodiment of the present invention, a system and method for attaching a PTO 110 to an attachment element 112 including an attachment element housing 114. The attachment element 112 functions as an adapter between the PTO 110 and a transmission (not shown). In the depicted second embodiment, the attachment element housing 114 is substantially rectangular in shape including a mounting surface 116, a first attachment surface 118 opposite and spaced apart from the mounting surface 116, at least one side 120 extending between the mounting surface 116 and the first attachment surface 118, the at least one side 120 including an interior 122 and an exterior 124, and an internal void 126 defined by the interior 122 of the at least one side 120.

The attachment element housing 114 carries an input shaft 128 extending from the at least one side 120 across the internal void 126. An input gear 130 is carried on and rotatable about the input shaft 128. The input gear 130 is located partially within the internal void 126. The radial diameter of the input gear 130 is greater than the distance between the first attachment surface 118 and the mounting surface 116, such that the input gear 120 extends radially from the internal void 126 in the direction of both the mounting surface 116 and in the direction of the first attachment surface 118.

In some embodiments, the attachment element housing 114 includes at least one channel 132 extending from the first attachment surface 118 to the mounting surface 116, the channel 132 being sized to receive a fastener (not shown) such as, for example, a bolt or cap screw. The at least one channel 132 is located in the attachment element housing 114 to align with corresponding channel(s) in a transmission, such that the fastener may extend through the at least one channel 132 and thread into the corresponding transmission channel to secure the mounting surface 116 against the transmission. In preferred embodiments, the fastener, when threaded into the transmission channel, will not extend from the at least one channel 132 in the direction of the first attachment surface 118. When the attachment element 112 is secured to the transmission, the input gear 130 extends radially in the direction of the mounting surface 116 to engage a transmission gear (not shown) carried on and at least partially within the transmission, such that rotational force of the transmission gear may be transferred to the input gear 130.

The system further includes a PTO 110 including a PTO housing 134. In the depicted first embodiment, the PTO housing 134 includes a second attachment surface 136 configured to engage the first attachment surface 118 and includes an internal cavity 138 accessible through the second attachment surface 136. The second attachment surface 136 is bordered by a descending skirt 139 sized and configured to receive the at least one side 120 of the attachment element 112. The PTO housing 134 carries an output shaft 140 extending across the internal cavity 138. An output gear 142 is carried on and rotatable about the output shaft 140. The output gear 142 is located at least partially within the internal cavity 138. When the PTO 110 is attached to the attachment element 112, the first attachment surface 118 is substantially flush against the second attachment surface 136, and the at least one side 120 is received at least partially within the skirt 139. In some embodiments, at least one side 120 includes one or more circumferential O-rings 167 to form a seal between the at least one side 120 of the attachment element 112 and the skirt 139 of the PTO 110. As most easily seen in FIG. 10, in the depicted second embodiment, the skirt 139 extends to a length substantially flush with the mounting surface 116. The input gear 130 extends radially in the direction of the first and second attachment surfaces 118, 136 to engage the output gear 142 carried on and at least partially within the internal cavity 138, such that rotational force of the transmission gear may be transferred to the output gear 142 via the input gear 130. In some embodiments (not shown), the PTO housing may optionally include an intermediate gear at least partially within the housing, such that, when the attachment element 112 and PTO are attached, the input gear 130 engages the intermediate gear which in turn engages the output gear.

The PTO 110 attaches to the attachment element 112 via an engagement mechanism 144. In some embodiments, the engagement mechanism 144 includes one or more male interlocks 146 located on one of the PTO housing 134 and the attachment element housing 114 and one or more female interlocks 148 located on the other of the PTO housing 134 and the attachment element housing 114. In the depicted embodiment, the engagement mechanism 144 includes a male interlock 146, such as a roller detent, located on the attachment element housing 114 and a female interlock 148, such as a shaped member located on the PTO housing 134 and including a female locking feature 150 configured to receive and engage at least a portion of the male interlock 146. In the depicted embodiment, the male interlock 146 includes at least one bore 152 in the interior 126 of the side 120 of the attachment element housing 114. Each bore 152 includes a moveable element 154, such as, for example, substantially cylindrical roller, operably sized to travel between a first position wherein the moveable element 154 is located substantially entirely within the bore 152 and a second position wherein the moveable element 154 is located at least partially external to the bore 152. A biasing mechanism 156, such as, for example, a coil spring, leaf spring, opposing magnets, ramp, armature, or similar mechanisms as known in the art, is configured to bias the moveable element 154 towards the second position. In the depicted embodiment, the biasing mechanism 156 is a coil spring located in the bore 152, the coil spring including a pair of opposing ends operably engaged to the moveable element 154 at one end and to the attachment element housing 114 at the opposite end. In some embodiments, a retaining element 158 is used to prevent the moveable element 154 and/or biasing mechanism 156 from entirely exiting or becoming misaligned with the bore 152. The retaining element 158 may be a roll pin, set screw, stake, or similar element as known in the art.

In the depicted second embodiment, the female interlock 148 includes a female locking feature 150, such as a cutout, groove, slot, recess, or similar feature as known in the art, sized and shaped to receive at least a portion of the moveable element 154 when the moveable element 154 is in the second position, the biasing mechanism 156 forcing the moveable element 154 into the female locking feature 150. When the PTO 110 and attachment element 112 are assembled, the first attachment surface 118 contacts the second attachment surface 136 and the engagement mechanism 144 prevents the two attachment surfaces 118, 136 from separating. In the depicted second embodiment, the female interlock 148 includes two female locking features 150, each of which receive the moveable element 154 of a separate male locking feature 146.

In the depicted embodiment, the female interlock 148 is removably attached to the PTO housing 134 via a pin 160 extending through the female interlock 148 and into the PTO housing 134. By removing the pin 160, the female interlock 148 may be removed from the PTO housing 134, disengaging and disassembling the engagement mechanism 144, and allowing the PTO 110 to be separated from the attachment element 112. In the depicted second embodiment, each female interlock 148 is removable attached via two parallel pins 160. In other embodiments, one pin, three pins, or a greater number of pins may be used. In other embodiments (not shown) where the PTO 110 is to be permanently attached to the attachment element 112, the female interlock 148 is machined directly onto the PTO housing 134. In some embodiments, the pin 160 may include a threaded cylindrical bore 162, such that a threaded member can be screwed into the threaded cylindrical bore 162 to engage the pin 160, then the threaded member linearly retracted to pull the pin 160 out of the PTO housing 134.

Figure 8:
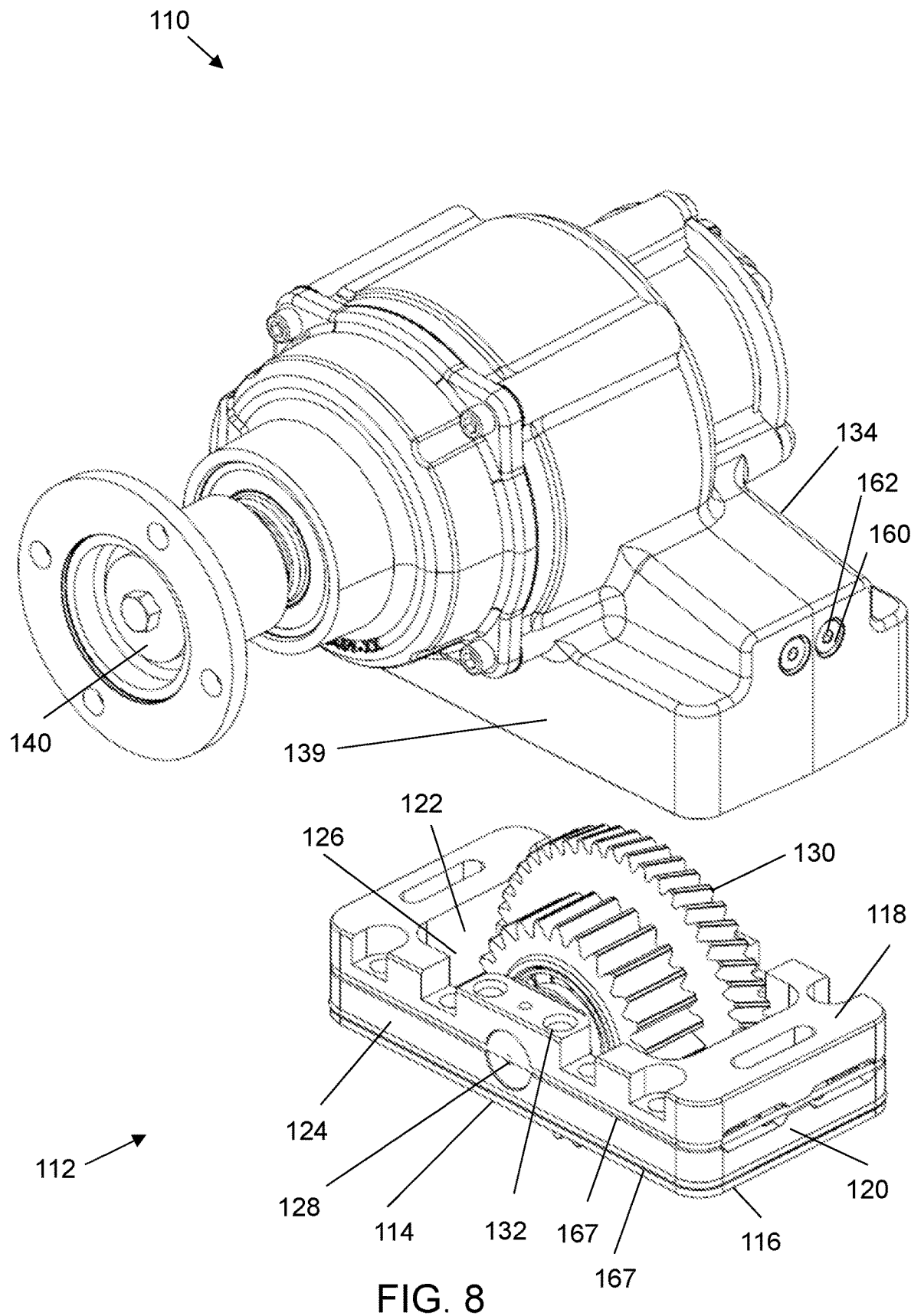
FIG. 8 depicts perspective view of a spaced apart PTO and adapter according to a second embodiment of the present invention.
Figure 9:
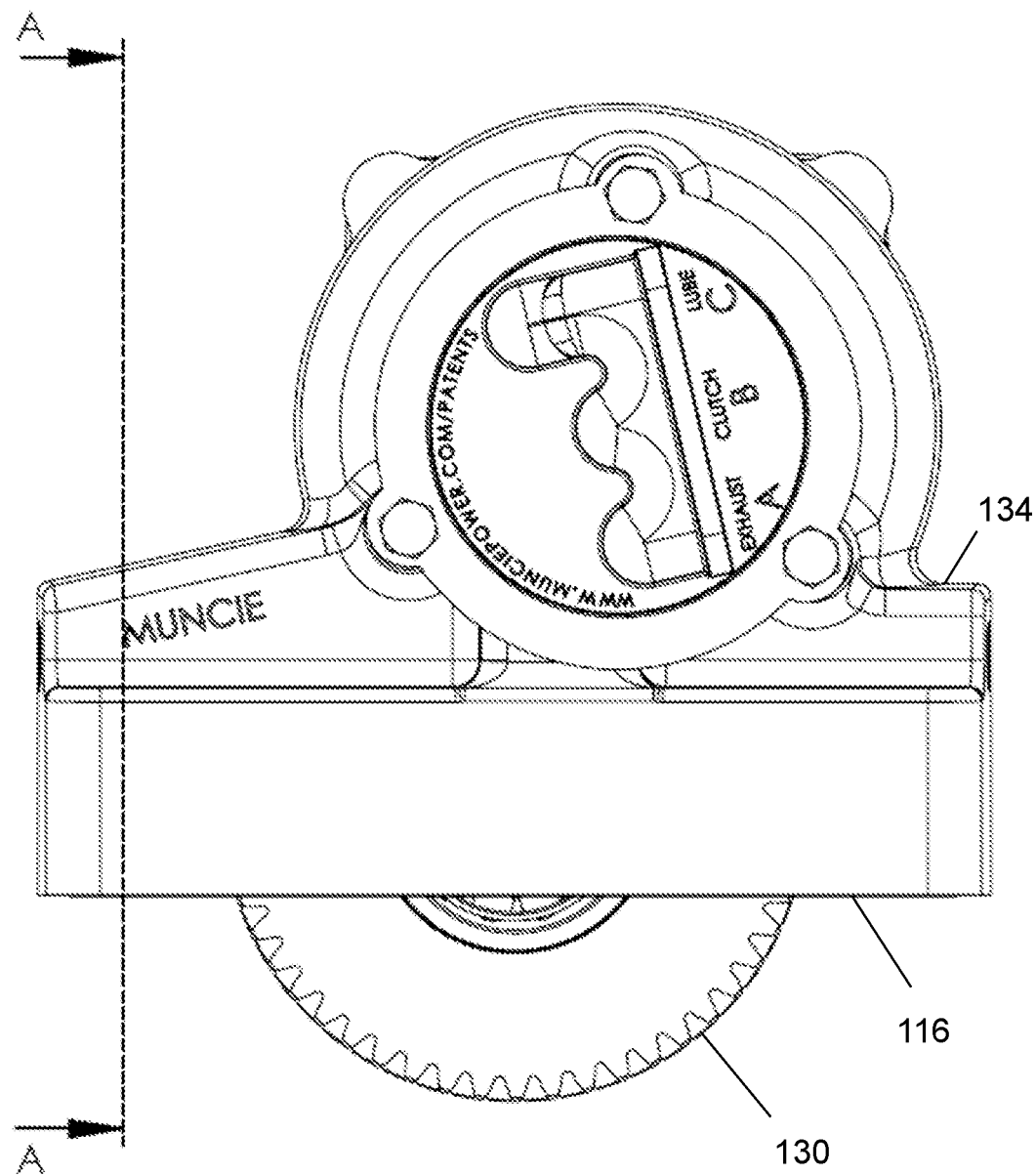
FIG. 9 depicts a side view of an assembled PTO and adapter of the second embodiment.
Figure 10:
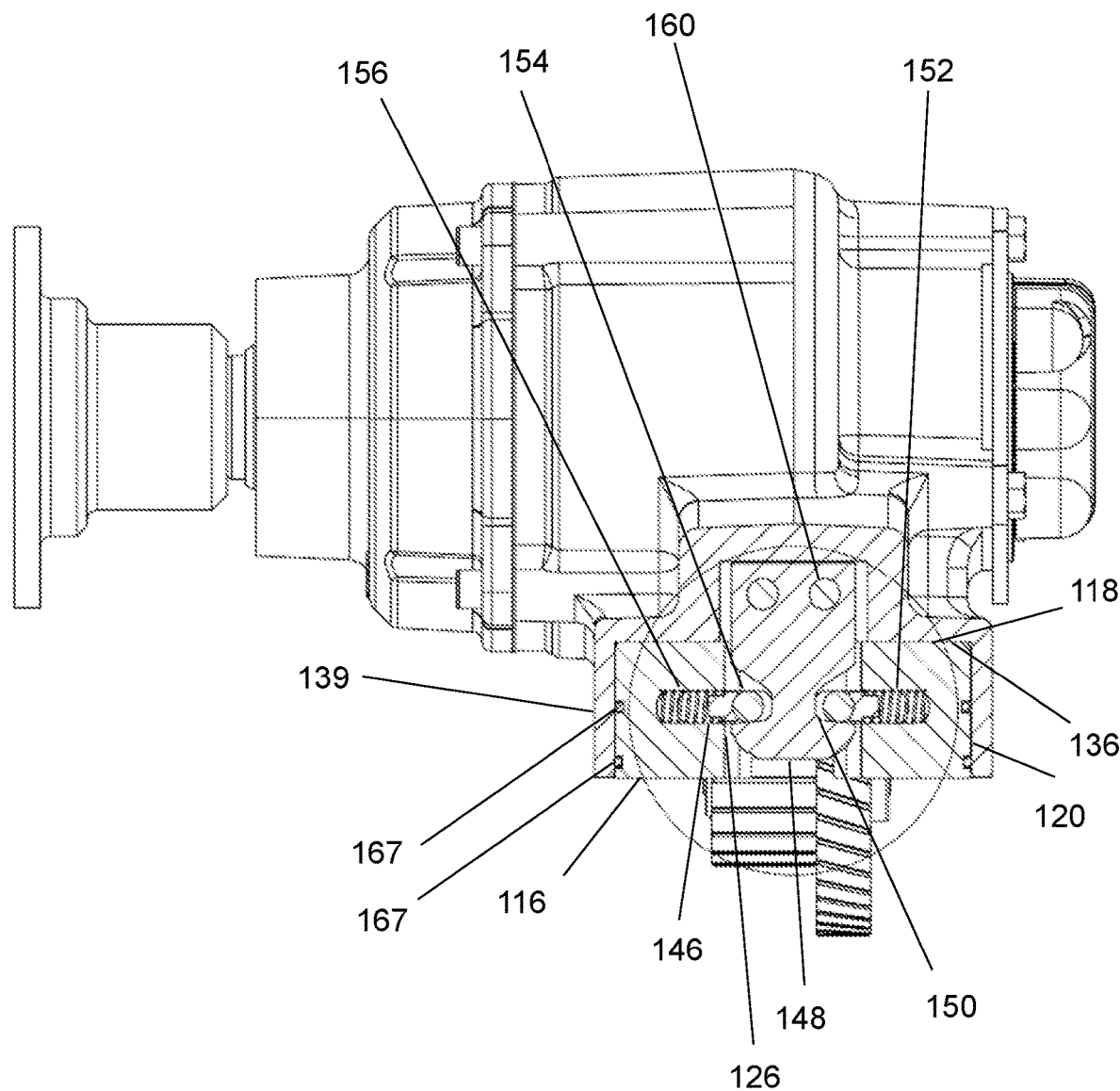
FIG. 10 depicts a cross-sectional front view of the assembled PTO and adapter along lines A-A of FIG. 9.
Figure 11:
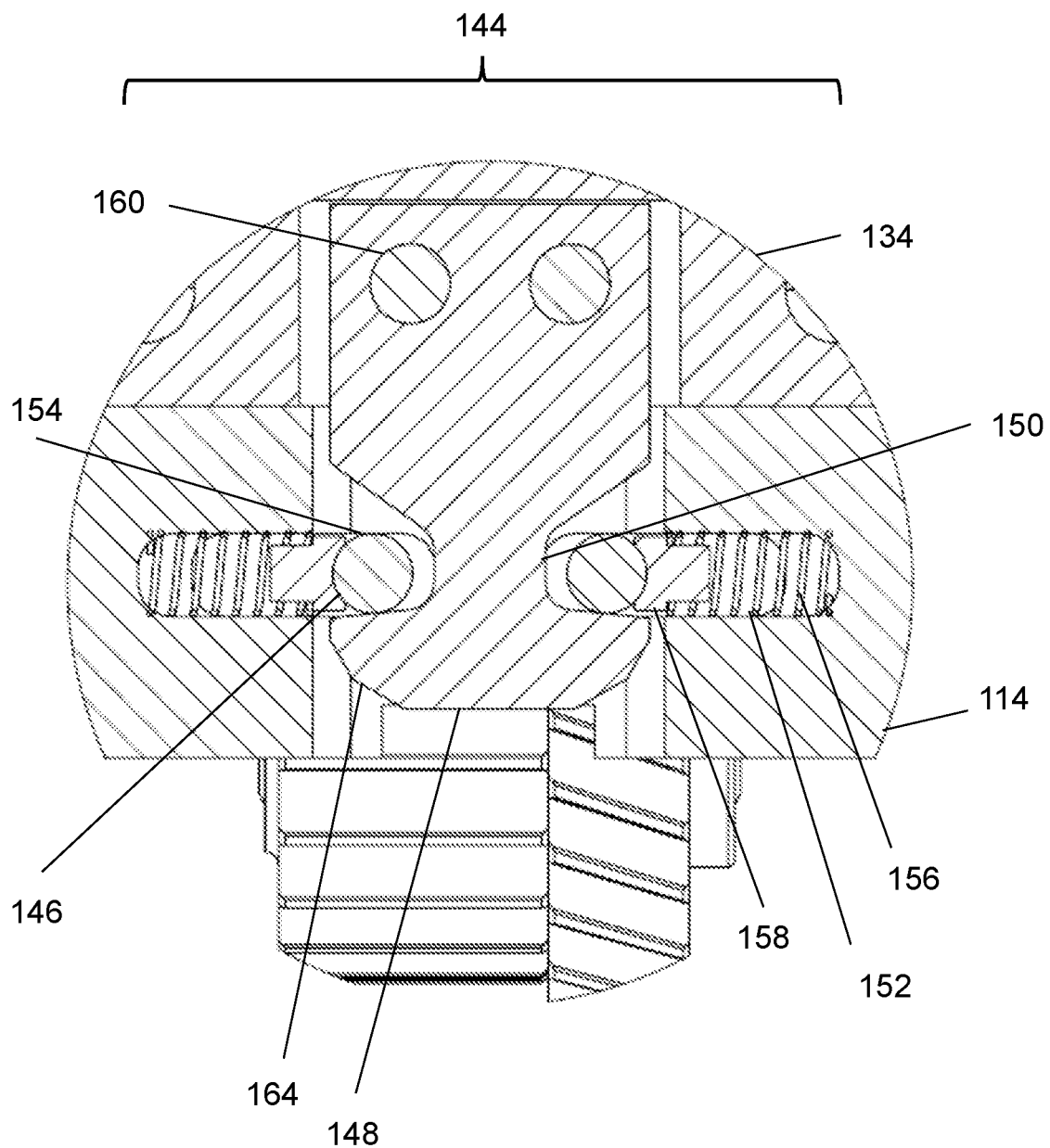
FIG. 11 depicts a magnified view of a section of FIG. 10.
Figure 12:
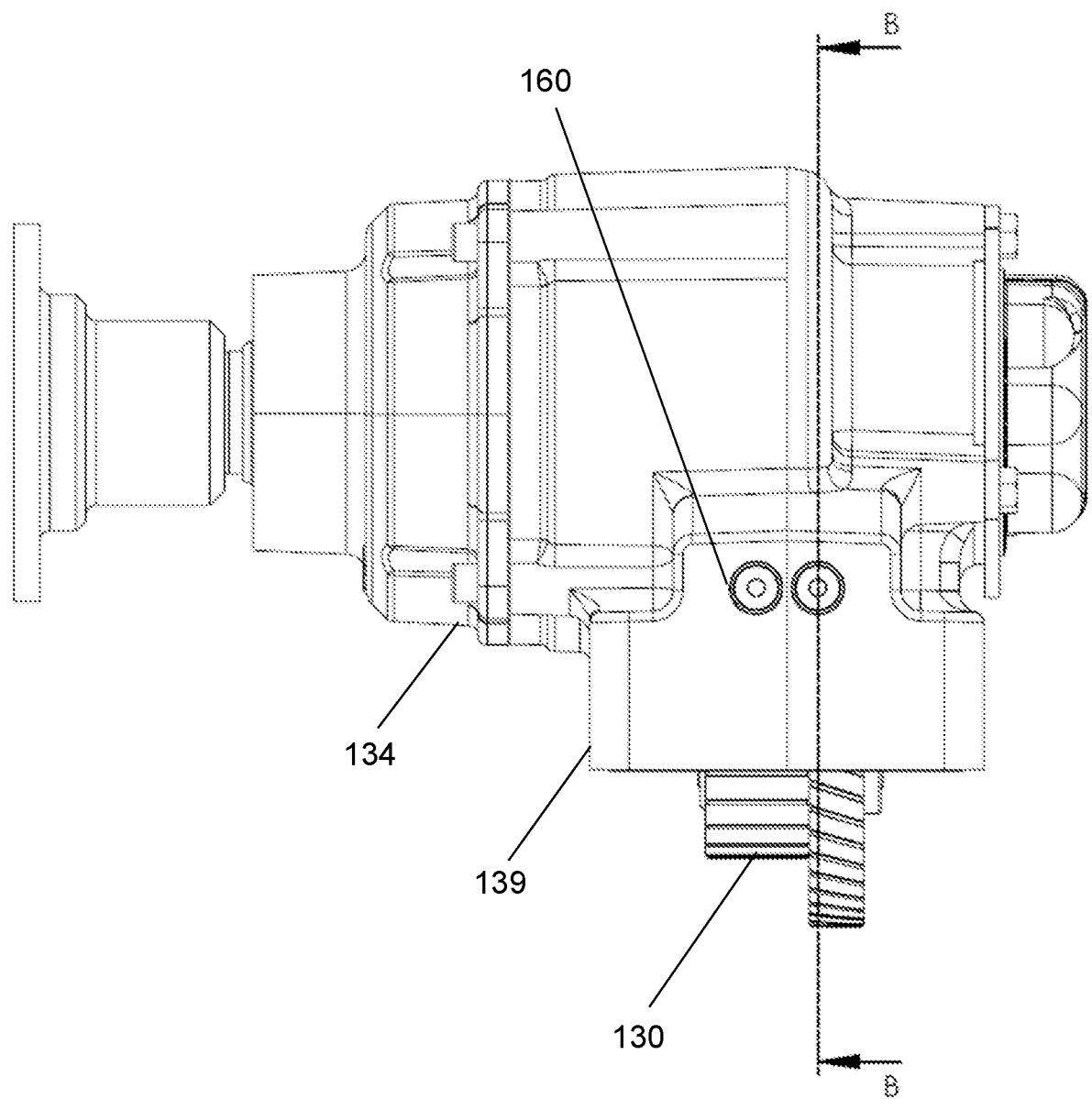
FIG. 12 depicts a front view of the assembled PTO and adapter of the second embodiment.

As most easily seen in FIG. 11, the female interlock 148 includes a ramp 164 inclined at a non-parallel and non-perpendicular angle in respect to the female locking feature 150 and the bore 152. As the second embodiment of the PTO 110 and attachment element 112 move from a spaced apart relationship (as shown in FIG. 8) to the an engaged relationship (as shown in FIGS. 9-14), the ramp 164 contacts the moveable element 154, forcing the moveable element 154 to transition from the second position to the first position by driving the moveable element 154 into the bore 152. Once the ramp 164 bypasses the moveable element 154, the biasing mechanism 156 returns the moveable element 154 to the second position, forcing the moveable element 154 into the female locking feature 150 and thereby mechanically interlocking the PTO 110 and attachment element 112.

Figure 13:
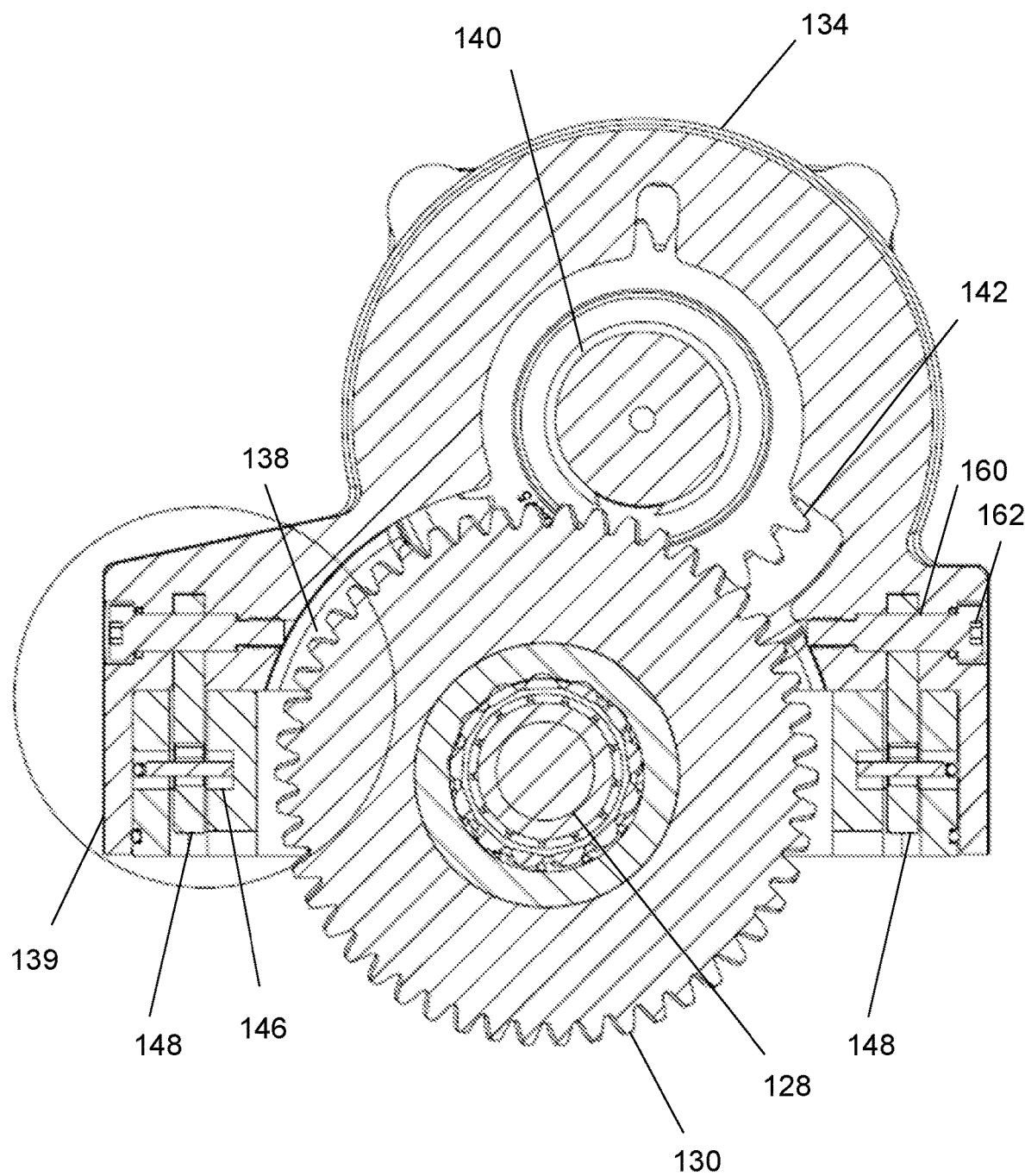
FIG. 13 depicts a cross-sectional side view of the assembled PTO and adapter along lines B-B of FIG. 12.
Figure 14:
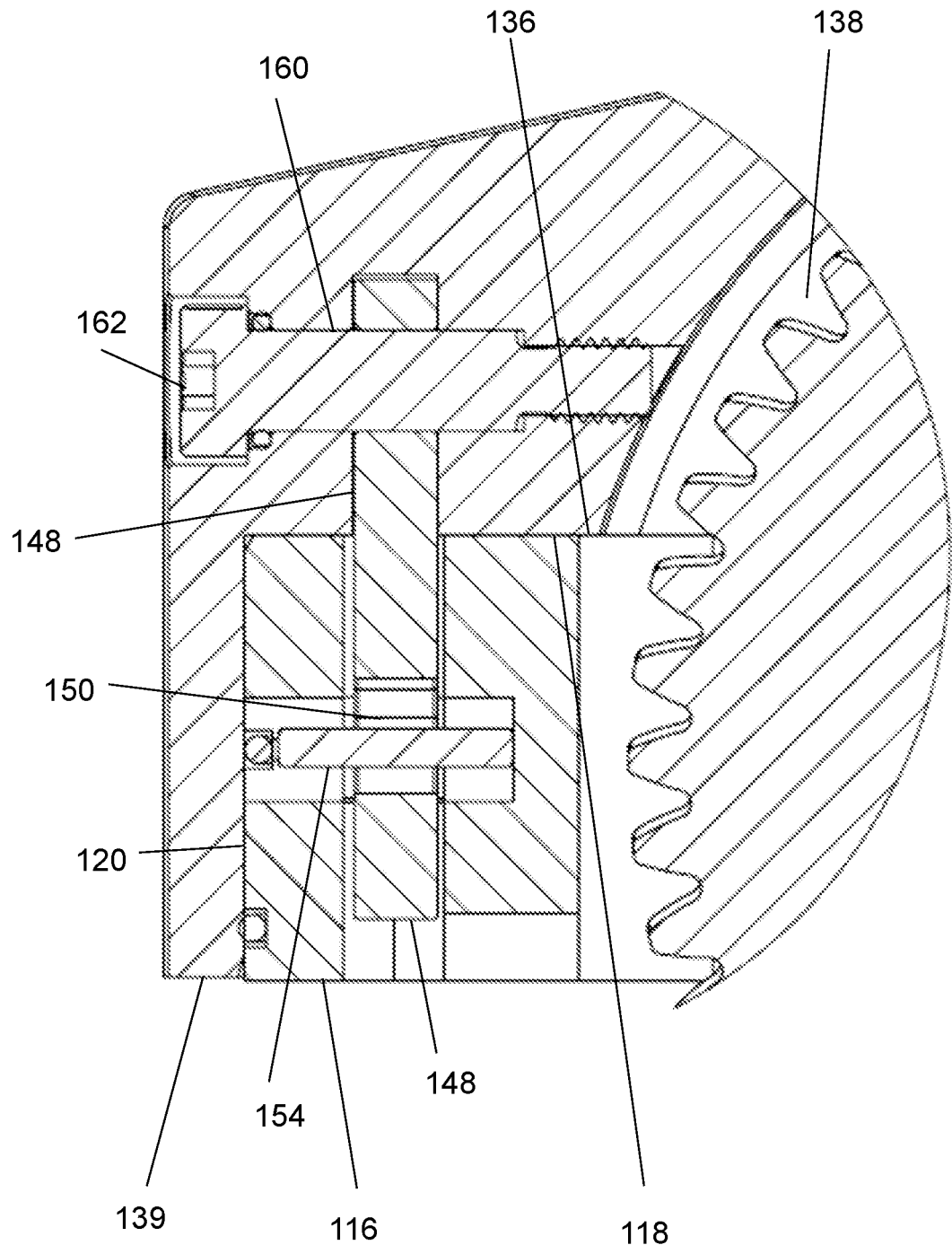
FIG. 14 depicts a magnified view of a section of FIG. 13.
Figure 15:
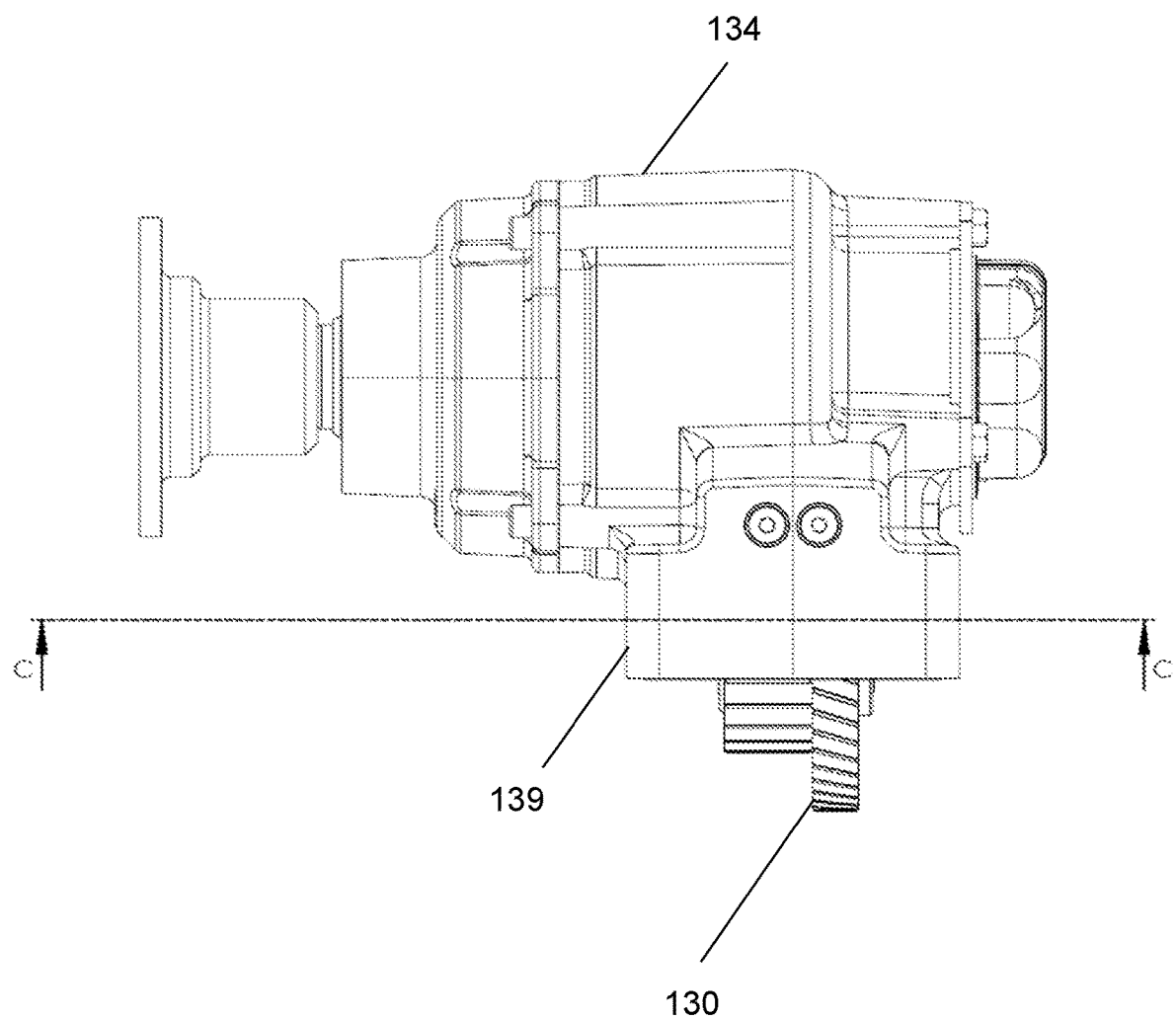
FIG. 15 depicts a front view of the assembled PTO and adapter of the second embodiment.
Figure 16:
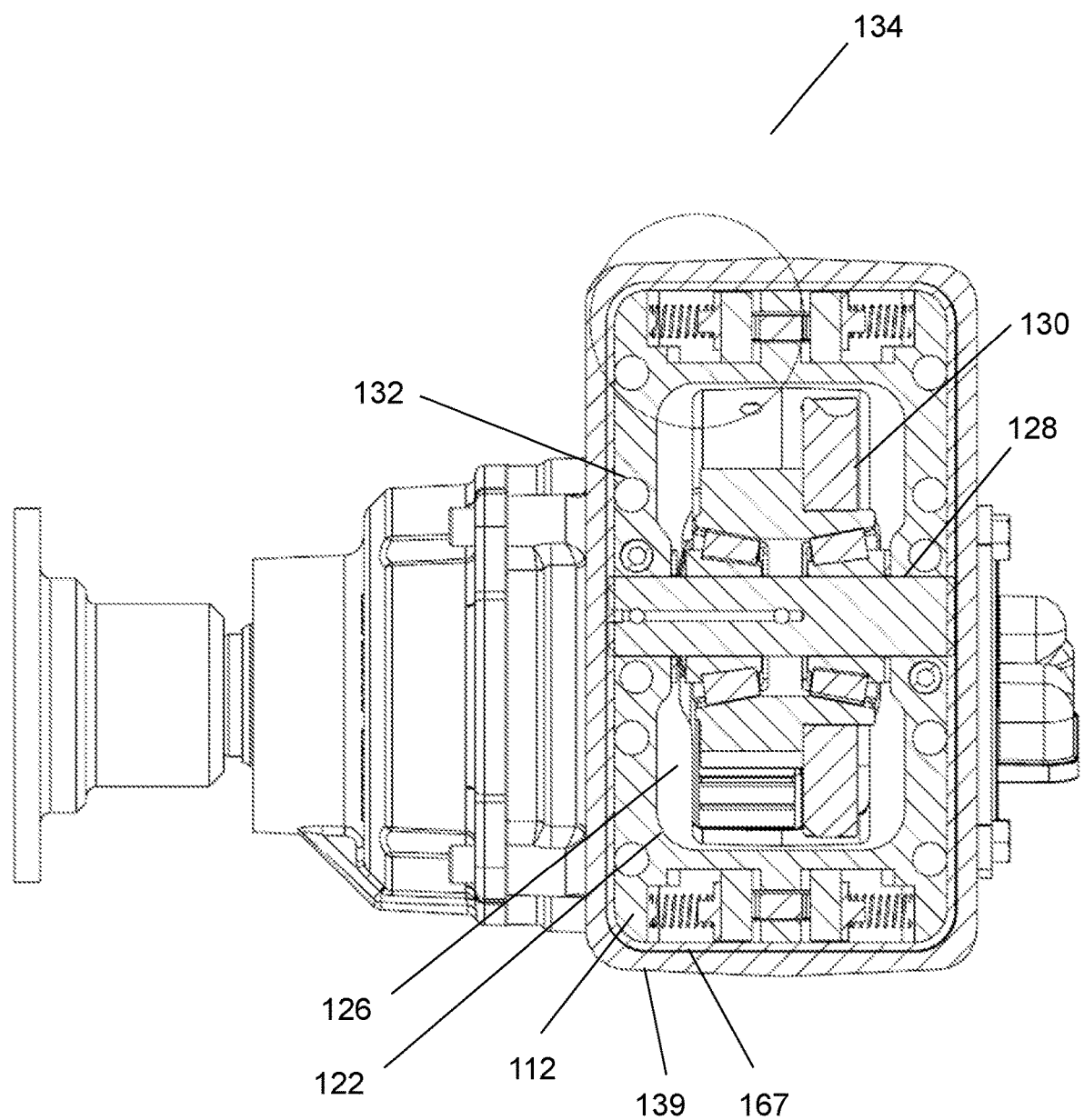
FIG. 16 depicts a cross-sectional side view of the assembled PTO and adapter along lines C-C of FIG. 15.
Figure 17:
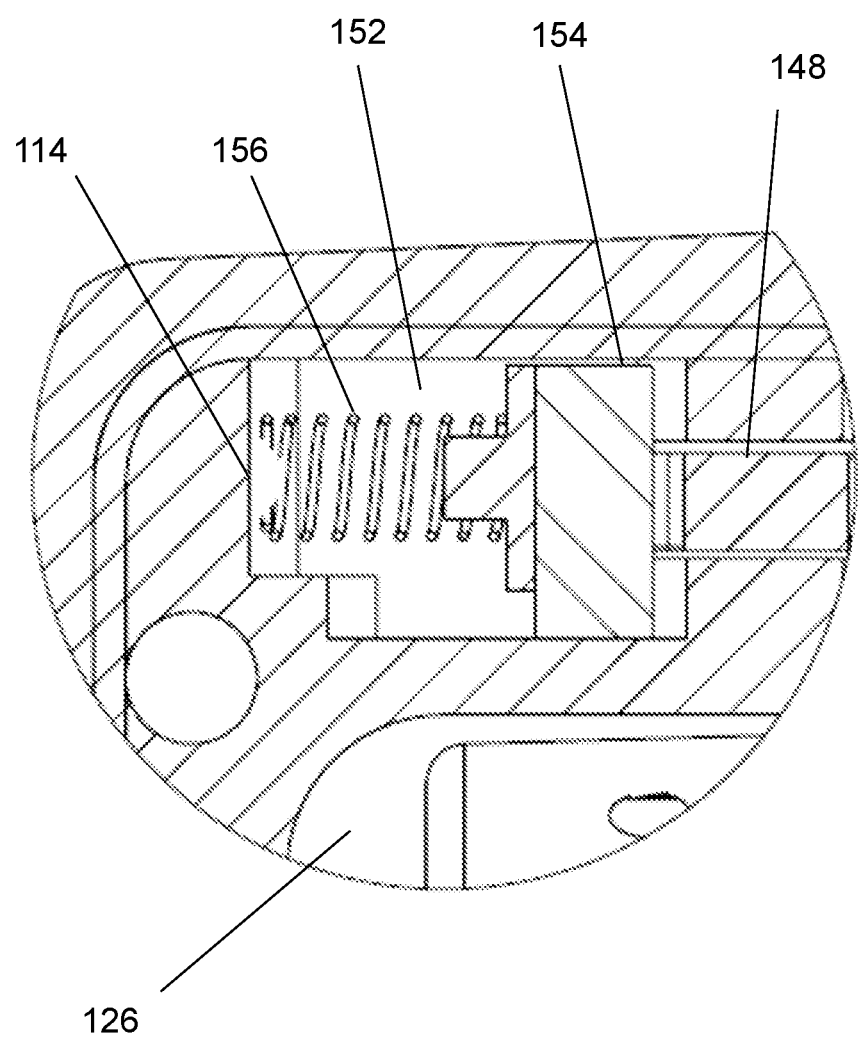
FIG. 17 depicts a magnified view of a section of FIG. 16.

As most easily seen in FIG. 13, the depicted second embodiment includes two female interlocks 148. As most easily seen in FIG. 11, each female interlock includes two opposing female locking features 150, each engaged by a separate moveable element 154 of a separate male locking feature 146. In other embodiments (not shown), the male interlocks 146 are located in the PTO housing 134 and the female interlocks 148 are located on the attachment element housing 112. In further embodiments, male interlocks 146 and female interlocks 148 may be present on both the PTO housing 134 and the attachment element housing 112.

In use, the system and method for PTO attachment includes a two-step attachment process. In the first step, the mounting surface 116 of the attachment element 112 is contacted to a transmission at a location where the input gear 130 carried by the attachment element 112 is operatively engaged to a transmission gear carried by the transmission. The attachment element 112 is then secured to the transmission, such as, for example, by inserting fasteners through the at least one channel 132 extending from the first attachment surface 118 to the mounting surface 116, and onward into a corresponding channel in the transmission. An installer may then, in some embodiments, use a torque wrench to apply a desired tension to the fasteners. Additional or alternative means for securing the attachment element 112 to the transmission may also be used. When the attachment element 112 is secured to the transmission, the input gear 130 extends radially in the direction of the mounting surface 116 to engage a transmission gear carried on and at least partially within the transmission, such that rotational force of the transmission gear may be transferred to the input gear 130.

In the second step, the second attachment surface 136 of the PTO 110 is advanced towards and contacted against the first attachment surface 118 of the attachment element 112 and the at least one side 120 of the attachment element 112 is received at least partially within the skirt 139. As the PTO 110 advances, the ramp 164 of the female interlock 148 contacts and drives the moveable element 154 from the second position to the first position. After the ramp 164 passes the moveable element 154, the moveable element 154 returns to the second position where it is received by the female locking feature 150. This mechanical engagement between the moveable element 154 and female locking feature 150 prevents the PTO 10 from separating from the attachment element 112 in a direction perpendicular to the attachment surfaces 118, 136. Mechanical engagement between the at least one side 120 and the enclosing skirt 139 prevents the PTO 110 from moving with respect to the attachment element 112 in directions in the plane of the attachment surfaces 118, 136.

To separate the PTO 110 from the attachment element 112, an individual would remove the pins 160 extending through the at least one female interlock 148, thereby detaching the at least one female interlock 148 from the PTO 110, then move the PTO 110 apart from the attachment element 112 in a direction perpendicular to the attachment surfaces 118, 136.

Reference systems that may be used herein can refer generally to various directions (e.g., top, bottom, leftward, rightward, forward and rearward), which are merely offered to assist the reader in understanding the various embodiments of the disclosure and are not to be interpreted as limiting. It should be understood that the disclosed PTO housing may be mounted at different locations and different orientations with respect to different engines and transmissions. Other reference systems may be used to describe various embodiments.

While the disclosed invention is described primarily in terms of embodiments including an attachment element 12, 112 carrying an input gear 30, 130 and a separate PTO 10, 110 carrying an output gear 42, 142 and, optionally, an intermediate gear, it should be understood that the positioning of gears may differ in different embodiments. For example, the input, output, and one or more optional intermediate gears may all be carried on the PTO, and the input gear may extend through the internal void of the attachment element to engage the transmission gear.

It should be understood that the disclosed engagement mechanism need not only be used to attach a PTO 10, 110 to an attachment element 12, 112 functioning as an adapter between the PTO 10, 110 and a transmission. In other embodiments, the same engagement mechanism 44, 144 could be used to attach a PTO 10, 110 to other equipment. For example, the attachment element could instead be a pump, gear box, compressor, or other equipment as commonly attached to PTOs. In such embodiments, the attachment element may lack a mounting surface, input shaft, input gear, and at least one channel.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A system for attaching a power takeoff (PTO) to an attachment element, comprising:
    the attachment element including
        an attachment element housing including
            a first attachment surface;
    the PTO including
        a PTO housing including
            a second attachment surface configured to engage the first attachment surface;
    an engagement mechanism for removably attaching the PTO housing to the attachment element housing, the engagement mechanism including
        at least one bore in one of the attachment element housing and the PTO housing, each bore including
            a moveable element operably sized to travel between a first position wherein the moveable element is located within the bore and a second position wherein the moveable element is located at least partially external to the bore, and
            a biasing mechanism operably engaged to the moveable element and to the one of the attachment element housing and the PTO housing such that the moveable element is biased toward the second position; and
        at least one female interlock removably attached to the other of the attachment element housing and the PTO housing, the female interlock configured to engage the moveable element when the first attachment surface abuts the second attachment surface and when the moveable element is in the second position.

2. The system of claim 1,
    wherein the attachment element housing includes a mounting surface opposite and spaced apart from the first attachment surface and at least one side extending between the mounting surface and the first attachment surface, the at least one side including an interior and an exterior, and
    an internal void defined by the interior of the at least one side; and
    further comprising a means for securing the mounting surface to a transmission housing.

3. The system of claim 2, wherein the second attachment surface is bordered by a descending skirt sized and configured to receive at least a portion of the at least one side of the attachment element housing.

4. The system of claim 2, further comprising
    an input shaft carried on the attachment element housing, the input shaft extending from the at least one side across the internal void; and
    an input gear carried on and rotatable about the input shaft, the input gear located partially within the internal void and extending radially from the internal void in the direction of the mounting surface and in the direction of the first attachment surface;
    wherein, when the mounting surface engages the transmission housing, the input gear engages a transmission gear carried on the transmission housing.

5. The system of claim 4,
    wherein the PTO housing includes a cavity internal to the PTO housing; and
    further comprising an output shaft carried on the PTO housing, the output shaft extending across the cavity; and
    an output gear carried on and rotatable about the output shaft, the output gear located at least partially within the cavity.

6. The system of claim 5, wherein, when the first attachment surface engages the second attachment surface, the input gear extends into the cavity and engages the output gear, such that rotational force of the transmission gear is transferred through the input gear to the output gear.

7. The system of claim 5, further comprising a raised rim on the first attachment surface, the raised rim bordering the interior of the at least one side and extending substantially perpendicular from the first attachment surface, and wherein the raised rim is sized and shaped to extend within the cavity when the PTO housing is attached to the attachment element housing.

8. A method of mounting a power takeoff (PTO), comprising:
providing a transmission housing including at least one transmission housing channel;
providing a system for attaching the power takeoff (PTO) to an attachment element according to claim 2, wherein the attachment element housing includes at least one channel extending from the first attachment surface to the mounting surface, the at least one channel aligned with the at least one transmission housing channel;
contacting the mounting surface against the transmission housing;
inserting a fastener through the at least one channel into the at least one transmission housing channel;
contacting the first attachment surface to the second attachment surface; and
attaching the PTO housing to the attachment element housing via the engagement mechanism.

9. The method of claim 8, wherein the fastener, when inserted through the at least one channel into the at least one transmission housing channel, does not extend out of the at least one channel in the direction of the first attachment surface.

10. The method of claim 8, wherein attaching the PTO housing to the attachment element housing via the engagement mechanism includes engaging the movable element using the female interlock when the movable element is in the second position.

11. The system of claim 1, wherein the moveable element is one of a substantially spherical ball and a roller.

12. The system of claim 1, wherein the female interlock includes a female locking feature and a ramp inclined at a non-parallel and non-perpendicular angle in respect to the female locking feature and the bore.

13. The system of claim 1, wherein, at the first position, the moveable element is located entirely within the bore.

14. The system of claim 1, wherein the female interlock is removably attached to the other of the attachment element housing and the PTO housing via a removable pin extending through the female interlock and into the other of the attachment element housing and the PTO housing.

15. A system for attaching a power takeoff (PTO) to a transmission, comprising:
an attachment element including
an attachment element housing including
a mounting surface,
a first attachment surface opposite and spaced apart from the mounting surface,
at least one side extending between the mounting surface and the first attachment surface, the at least one side including an interior and an exterior, and
an internal void defined by the interior of the at least one side;
an input shaft carried on the attachment element housing, the input shaft extending from the at least one side across the internal void;
an input gear carried on and rotatable about the input shaft, the input gear located partially within the internal void and extending radially from the internal void in the direction of the mounting surface and in the direction of the first attachment surface;
the PTO including
a PTO housing including
a second attachment surface configured to engage the first attachment surface, and
a cavity internal to the PTO housing;
an output shaft carried on the PTO housing, the output shaft extending across the cavity;
an output gear carried on and rotatable about the output shaft, the output gear located at least partially within the cavity;
means for securing the mounting surface of the attachment element housing to a transmission housing; and
an engagement mechanism for removably attaching the PTO housing to the attachment element housing;
wherein, when the first attachment surface engages the second attachment surface, the input gear extends into the cavity and engages the output gear; and
wherein, when the mounting surface engages the transmission housing, the input gear engages a transmission gear carried on the transmission housing, such that rotational force of the transmission gear is transferred through the input gear to the output gear.

16. The system of claim 15, wherein the engagement mechanism includes one of a ball detent and a roller detent.

17. The system of claim 15, wherein the engagement mechanism includes
at least one bore in one of the attachment element housing and the PTO housing, each bore including
a moveable element operably sized to travel between a first position wherein the moveable element is located substantially entirely within the bore and a second position wherein the moveable element is located at least partially external to the bore, and
a biasing mechanism operably engaged to the moveable element and to the one of the attachment element housing and the PTO housing such that the moveable element is biased toward the second position; and
at least one female interlock removably attached to the other of the attachment element housing and the PTO housing, the female interlock configured to engage the moveable element when the first attachment surface abuts the second attachment surface and when the moveable element is in the second position.

18. The system of claim 17, wherein the female interlock is removably attached to the other of the attachment element housing and the PTO housing via a removable pin extending through the female interlock and into the other of the attachment element housing and the PTO housing.

19. A method of uninstalling a power takeoff, comprising:
providing a system for attaching the power takeoff (PTO) to a transmission according to claim 18;
removing the removable pin;
removing the female interlock; and
separating the PTO from the attachment element.

20. A method of installing a power takeoff, comprising:
providing a system for attaching the power takeoff (PTO) to a transmission according to claim 15;
securing the attachment element housing to the transmission; and
attaching the PTO housing to the attachment element housing via the engagement mechanism.

* * * * *